US011912558B2

(12) United States Patent
Augsburger

(10) Patent No.: US 11,912,558 B2
(45) Date of Patent: Feb. 27, 2024

(54) BEVERAGE DISPENSE HEAD ASSEMBLY

(71) Applicant: Smart Bar USA, LLC, Henderson, NV (US)

(72) Inventor: Josh Augsburger, Henderson, NV (US)

(73) Assignee: Smart Bar USA LLC, Henderson, NV (US)

(*) Notice: Subject to any disclaimer, the term of this patent is extended or adjusted under 35 U.S.C. 154(b) by 0 days.

(21) Appl. No.: 17/692,398

(22) Filed: Mar. 11, 2022

(65) Prior Publication Data

US 2022/0289548 A1 Sep. 15, 2022

Related U.S. Application Data

(60) Provisional application No. 63/160,252, filed on Mar. 12, 2021.

(51) Int. Cl.
*B67D 1/00* (2006.01)

(52) U.S. Cl.
CPC ......... *B67D 1/0046* (2013.01); *B67D 1/0021* (2013.01); *B67D 1/0051* (2013.01); *B67D 1/0083* (2013.01)

(58) Field of Classification Search
CPC .... B67D 1/005; B67D 1/0021; B67D 1/0044; B67D 1/0046; B67D 1/0048; B67D 1/0051; B67D 1/0052; B67D 1/0053; B67D 1/0081; B67D 1/0083
See application file for complete search history.

(56) References Cited

U.S. PATENT DOCUMENTS

| | | | | |
|---|---|---|---|---|
| 1,985,412 | A | 12/1934 | Jackson | |
| 2,876,806 | A | 3/1959 | Kirk et al. | |
| 3,575,352 | A * | 4/1971 | Hall | B67D 1/005 239/434.5 |
| 3,592,367 | A | 7/1971 | Landis et al. | |
| 3,940,019 | A | 2/1976 | Kross et al. | |
| 4,162,028 | A | 7/1979 | Reichenberger | |
| 4,276,999 | A | 7/1981 | Reichenberger | |
| 4,392,588 | A | 7/1983 | Scalera | |
| 4,708,266 | A | 11/1987 | Rudick | |
| 4,928,854 | A * | 5/1990 | McCann | B67D 1/0044 222/145.5 |
| 4,974,500 | A | 12/1990 | Boyd et al. | |
| 5,033,651 | A | 7/1991 | Whigham et al. | |

(Continued)

OTHER PUBLICATIONS

International Search Report and Written Opinion of Application No. PCT/US22/20132 dated Jun. 15, 2022 (14 pages).

*Primary Examiner* — Patrick M. Buechner
(74) *Attorney, Agent, or Firm* — Barnes & Thornburg LLP

(57) ABSTRACT

A beverage dispense head assembly is made of a liquor port assembly, a mixer port assembly, a diffuser and a mixing bowl. The liquor port assembly has liquor ports that dispense liquid at an inward angle and outside the mixing bowl. The mixer port assembly has a first mixer port that dispenses liquid into the diffuser, and a second mixer port that dispenses liquid directly into the cavity of the mixing bowl. The diffuser has a cavity that dispenses liquid onto a shoulder extending from the diffuser wall, and a flange with ports to allow liquid to escape from the diffuser and into the cavity of the mixing bowl. The mixing bowl has a second opening at a second end thereof providing an exit to the mixing bowl for the liquids therein.

21 Claims, 12 Drawing Sheets

(56) References Cited

U.S. PATENT DOCUMENTS

| | | | | |
|---|---|---|---|---|
| 5,048,726 | A * | 9/1991 | McCann | B67D 1/0044 239/434 |
| 5,129,551 | A | 7/1992 | Gott | |
| 5,190,188 | A | 3/1993 | Credle, Jr. | |
| 5,203,474 | A * | 4/1993 | Haynes | B67D 1/005 239/419 |
| 5,269,442 | A | 12/1993 | Vogel | |
| 5,350,082 | A | 9/1994 | Kiriakides, Jr. et al. | |
| 5,731,981 | A | 3/1998 | Simard | |
| 6,047,859 | A * | 4/2000 | Schroeder | B67D 1/0044 222/145.5 |
| 6,135,009 | A | 10/2000 | Lassota | |
| 6,253,963 | B1 | 7/2001 | Tachibana | |
| 6,401,981 | B1 * | 6/2002 | McCann | B67D 1/0052 239/DIG. 19 |
| 6,422,422 | B1 | 7/2002 | Forbes | |
| 6,892,762 | B2 | 5/2005 | Porter et al. | |
| 6,896,159 | B2 | 5/2005 | Crisp, III et al. | |
| 7,267,247 | B1 | 9/2007 | Crunkleton, III et al. | |
| 7,445,133 | B2 | 11/2008 | Ludovissie et al. | |
| 7,578,415 | B2 | 8/2009 | Ziesel et al. | |
| 7,658,006 | B2 | 2/2010 | Schroeder | |
| 7,866,509 | B2 | 1/2011 | Ziesel | |
| 8,047,402 | B2 | 11/2011 | Ziesel | |
| 8,091,737 | B2 | 1/2012 | Smeller et al. | |
| 8,162,177 | B2 | 4/2012 | Ziesel | |
| 8,190,290 | B2 | 5/2012 | Crisp, III | |
| 8,328,050 | B2 | 12/2012 | Ziesel | |
| 8,387,829 | B2 | 3/2013 | Schroeder et al. | |
| 8,442,674 | B2 | 5/2013 | Tilton et al. | |
| 8,528,786 | B2 | 9/2013 | Gates | |
| 8,651,333 | B2 | 2/2014 | Metropulos et al. | |
| 8,807,392 | B2 | 8/2014 | Smeller et al. | |
| 8,820,580 | B2 | 9/2014 | Ziesel | |
| 9,026,245 | B2 | 5/2015 | Tilton et al. | |
| 9,090,446 | B2 | 7/2015 | Crisp, III | |
| 9,090,447 | B2 | 7/2015 | Crisp, III | |
| 9,090,449 | B2 | 7/2015 | Crisp, III | |
| 9,271,604 | B2 | 3/2016 | Hecht | |
| 9,656,849 | B2 | 5/2017 | Hawken | |
| 9,896,322 | B2 | 2/2018 | Hecht | |
| 10,071,899 | B2 | 9/2018 | Mastro et al. | |
| 10,442,671 | B2 | 10/2019 | Hecht et al. | |
| 10,472,220 | B2 | 11/2019 | Moore et al. | |
| 10,507,479 | B2 | 12/2019 | Bertness et al. | |
| 10,759,645 | B2 * | 9/2020 | Aslam | B67D 1/005 |
| 2005/0115989 | A1 | 6/2005 | Ludovissie et al. | |
| 2006/0097009 | A1 * | 5/2006 | Bethuy | B67D 1/0081 222/129.1 |
| 2014/0372233 | A1 | 12/2014 | Knecht et al. | |
| 2016/0009539 | A1 | 1/2016 | Jersey et al. | |
| 2017/0088410 | A1 | 3/2017 | Wing et al. | |
| 2017/0190554 | A1 | 7/2017 | Dahlberg et al. | |
| 2018/0282143 | A1 * | 10/2018 | Chang | B67D 1/1252 |
| 2018/0327245 | A1 | 11/2018 | Ziesel | |
| 2019/0039873 | A1 | 2/2019 | Aslam et al. | |
| 2019/0194009 | A1 | 6/2019 | Gatipon et al. | |
| 2021/0130148 | A1 * | 5/2021 | Zemko | B67D 1/0023 |
| 2021/0252534 | A1 * | 8/2021 | Eboigbodin | B05B 7/0408 |

* cited by examiner

BEVERAGE DISPENSE HEAD ASSEMBLY

CROSS-REFERENCE TO RELATED APPLICATIONS

This application claims the benefit of U.S. Provisional Patent Application No. 63/160,252 filed Mar. 12, 2021, which is expressly incorporated herein by reference and made a part hereof.

FEDERALLY SPONSORED RESEARCH OR DEVELOPMENT

Not Applicable.

TECHNICAL FIELD

The present invention relates generally to a beverage dispense head assembly, and more specifically to a beverage dispense head assembly for dispensing mixed beverages.

BACKGROUND OF THE INVENTION

Beverage dispense heads are well known in the art. While such dispense heads according to the prior art provide a number of advantages, they nevertheless have certain limitations. The present disclosure seeks to overcome certain of these limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a beverage dispenser head assembly.

The disclosed technology further relates to a beverage dispense head assembly comprising: a liquor port assembly comprising a liquor port head housing having a plurality of liquor ports positioned tangentially with respect to a horizontal plane of the liquor port head housing to dispense liquid through the liquor ports at an inward angle; a mixer port assembly fixed to the liquor port assembly, the mixer port assembly comprising a mixer port head and a downwardly extending mixer post extending through the liquor port assembly, the mixing post extending through the liquor port assembly, the mixer port assembly having at least one first mixer port extending through the mixer port head and a plurality of second mixer ports extending through the mixer post; a mixing bowl having a first opening at a first end thereof leading to a cavity therein, and a second opening at a second end thereof providing an exit to the mixing bowl, the second opening being smaller than the first opening, wherein the mixing bowl, adjacent the first end thereof, is removable fixed to the liquor port assembly adjacent a second side of the liquor port head housing; and, a diffuser located within the cavity of the mixing bowl and around the mixer post of the mixer port assembly to receive liquid passing through the at least one first mixer port, the diffuser being cylindrically shaped, the diffuser having a first end and a second end, a cylindrical inner wall that defines a central bore through which the mixer post extends, a cylindrical outer wall spaced from the cylindrical inner wall to create a diffuser cavity therebetween, the first end having an opening providing access to the diffuser cavity, the diffuser cavity having a bottom wall with a plurality of apertures, a radially extending annular shoulder extending from the diffuser between the bottom wall of the diffuser cavity and the second end of the diffuser, the annular shoulder having an angled top surface, and a flange extending from the diffuser adjacent the second end, the flange having a plurality of ports to allow fluid to escape from the diffuser and into the cavity of the mixing bowl.

The disclosed technology further relates to a beverage dispense head assembly comprising: a liquor port assembly; a mixer port assembly fixed to the liquor port assembly, the mixer port assembly comprising a mixer port head having at least one first mixer port and a plurality of second mixer ports, wherein at least one of the plurality of second mixer ports has a larger cross-sectional area than other of the plurality of second mixer ports; a mixing bowl having a first opening at a first end thereof leading to a cavity therein, and a second opening at a second end thereof providing an exit to the mixing bowl, the second opening being smaller than the first opening, wherein the mixing bowl, adjacent the first end thereof, is removable fixed to the liquor port assembly adjacent a second side of the liquor port assembly, and wherein the at least one first mixer port and the plurality of second mixer ports all operably dispense liquid into the mixing bowl; and, a diffuser located within the cavity of the mixing bowl and adjacent the mixer port assembly to receive liquid passing through at least one of the first mixer ports, the diffuser having a first end and a second end, the first end having an opening providing access to a diffuser cavity, the diffuser cavity having a bottom wall with a plurality of apertures, a shoulder extending from the diffuser between the bottom wall of the diffuser cavity and the second end of the diffuser, and a flange extending from the diffuser adjacent the second end, the flange having a plurality of ports to allow fluid to escape from the diffuser and into the cavity of the mixing bowl.

The disclosed technology further relates to a beverage dispense head assembly comprising: a liquor port assembly comprising a liquor port head housing having a plurality of liquor ports positioned tangentially with respect to a horizontal plane of the liquor port head housing to dispense liquid through the liquor ports at an inward angle; a mixer port assembly fixed to the liquor port assembly, the mixer port assembly comprising a mixer port head and a downwardly extending mixer post, the mixer port assembly having at least one first mixer port extending through the mixer port head and a plurality of second mixer ports extending through the mixer post; a mixing bowl having a first opening at a first end thereof leading to a cavity therein, and a second opening at a second end thereof providing an exit to the mixing bowl, the second opening being smaller than the first opening, wherein the mixing bowl, adjacent the first end thereof, is removable fixed to the liquor port assembly adjacent a second side of the liquor port assembly, and wherein the at least one first mixer port and the plurality of second mixer ports all operably dispense liquid into the mixing bowl; and, a diffuser located within the cavity of the mixing bowl and adjacent the mixer port assembly to receive liquid passing through some of the mixer ports, the diffuser having a first end and a second end, the first end having an opening leading to diffuser cavity, the diffuser cavity having a bottom wall with a plurality of apertures, a shoulder extending from the diffuser between the bottom wall of the diffuser cavity and the second end of the diffuser, and a flange extending from the diffuser adjacent the second end, the flange having a plurality of ports to allow fluid to escape from the diffuser and into the cavity of the mixing bowl.

The disclosed technology further relates to a beverage dispense head assembly wherein the liquor port head housing is in the shape of a ring.

The disclosed technology further relates to a beverage dispense head assembly wherein at least one of the plurality of second mixer ports has a larger cross-sectional area than other of the plurality of second mixer ports.

The disclosed technology further relates to a beverage dispense head assembly wherein the liquor port assembly further comprises a fitting within each of the liquor ports to receive tubing.

The disclosed technology further relates to a beverage dispense head assembly further comprising a first seal between the diffuser and the mixer port head, and a second seal between the diffuser and the mixing bowl.

The disclosed technology further relates to a beverage dispense head assembly further comprising a third seal between the diffuser and the mixer port head.

The disclosed technology further relates to a beverage dispense head assembly wherein the liquor port head has a receiver for receiving a mating member of the mixing bowl to releaseably secure the mixing bowl to the liquor port head.

The disclosed technology further relates to a beverage dispense head assembly further comprising a shoulder on an inner surface of the mixing bowl that engages the flange of the diffuser to assist in seating the diffuser adjacent the mixer port head in the beverage dispense head assembly.

The disclosed technology further relates to a beverage dispense head assembly further comprising a plurality of ribs on an inner surface of the mixing bowl adjacent the second opening of the mixing bowl.

The disclosed technology further relates to a beverage dispense head assembly wherein the flange of the diffuser extends radially distal the shoulder of the diffuser.

The disclosed technology further relates to a beverage dispense head assembly wherein the liquor port assembly comprises a liquor port head housing having a plurality of liquor ports positioned tangentially with respect to a horizontal plane of the liquor port head housing to dispense liquid through the liquor ports at an inward angle.

The disclosed technology further relates to a beverage dispense head assembly wherein all of the liquor ports of the liquor port head housing dispense liquid exterior of the mixing bowl.

The disclosed technology further relates to a beverage dispense head assembly wherein the mixer port head has a downwardly extending mixer post, and wherein some of the second mixer ports extend through the mixer post.

The disclosed technology further relates to a beverage dispense head assembly wherein the diffuser is cylindrically shaped and is positioned around the mixer post of the mixer port head.

The disclosed technology further relates to a beverage dispense head assembly wherein the shoulder of the diffuser has an angled top surface.

The disclosed technology further relates to a beverage dispense head assembly wherein the mixer port assembly diffuser is cylindrically shaped and is positioned around the mixer post of the mixer port head.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings.

Figure 1:
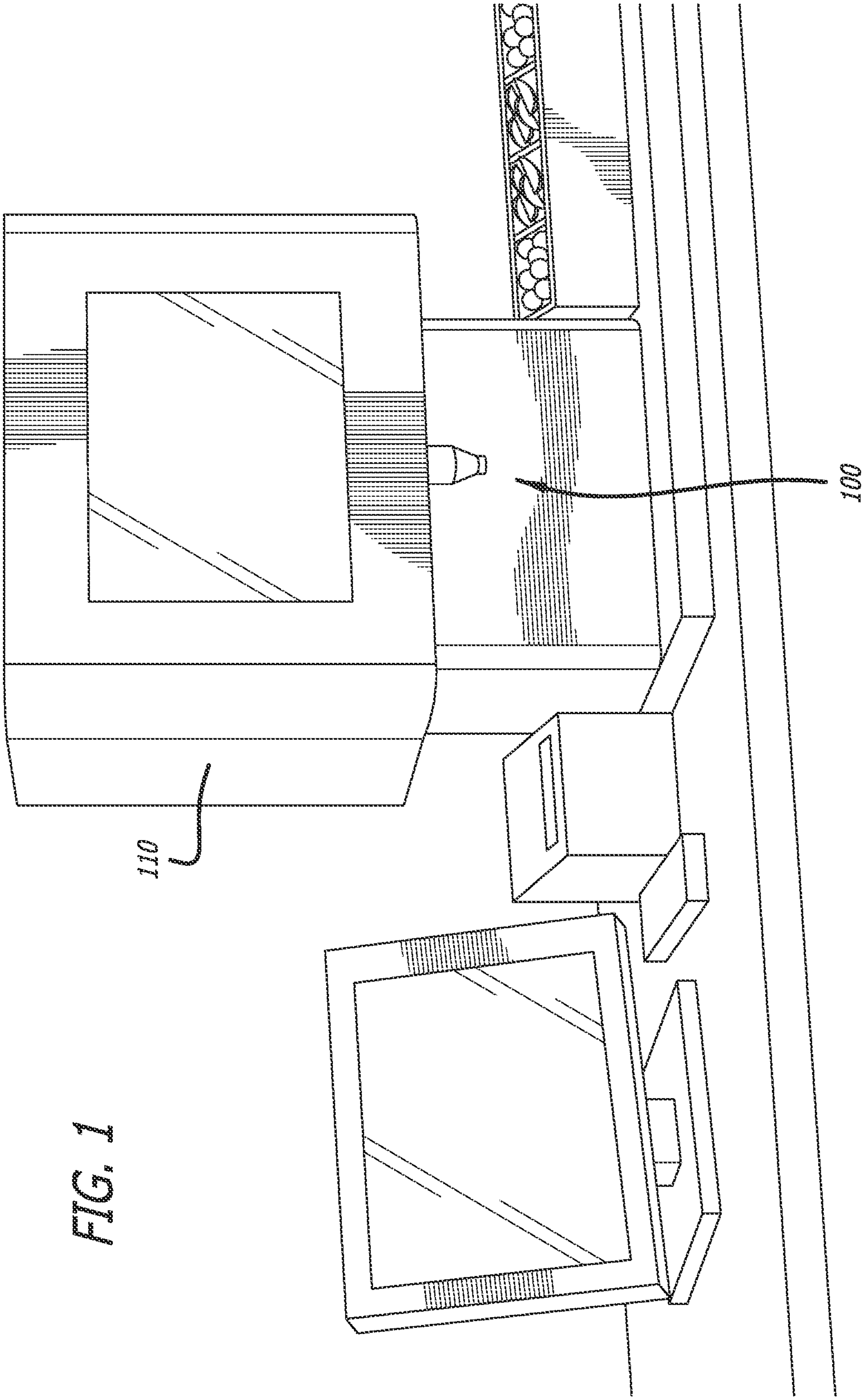
FIG. 1 is a perspective view of one example of the beverage dispense head assembly shown in its environment of use according to the present disclosure.
Figure 2:
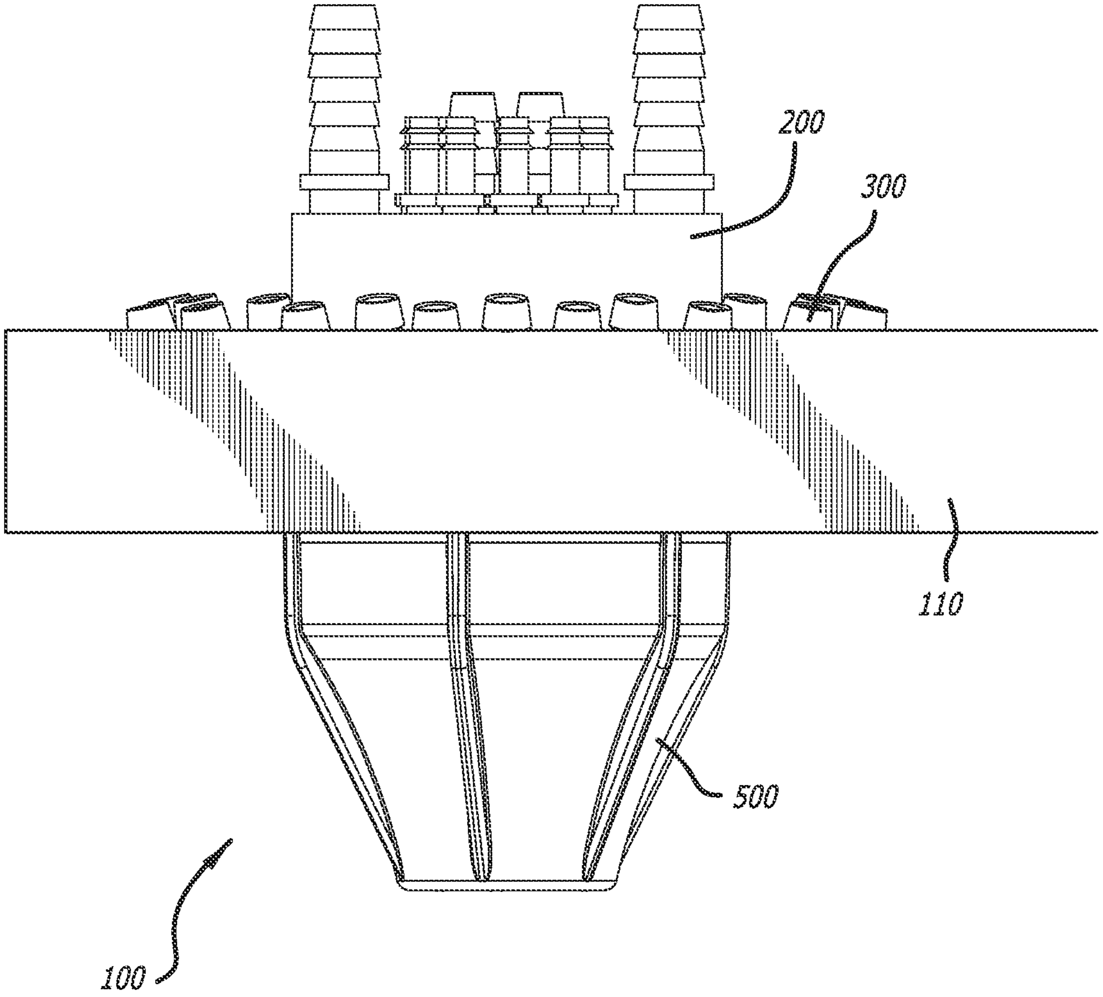
FIG. 2 is a front elevation view of the beverage dispense head assembly shown connected to a beverage dispenser in its environment of use according to the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law.

Generally, this disclosure describes embodiments and components of dispense head assemblies. The various examples disclosed herein relate to systems, methods, and equipment that may be used to create and dispense mixed beverages.

Referring now to the figures, and initially to FIG. 1, there is shown a beverage dispense head assembly 100 in one example of its environment of use. FIGS. 2-5, 10 and 11 further illustrate the dispense head assembly 100.

The beverage dispense head assembly 100 may be connected to a beverage dispensing machine 110 and located to allow a beverage container, such as a cup, to be placed underneath the beverage dispense head assembly 100 for dispensing a beverage from the beverage dispense head assembly 100 into the beverage container. The beverage dispense head assembly 100 is connected to a plurality of beverage ingredients through a plurality of tubes (not shown), as discussed in detail herein. In a preferred embodiment the beverage dispense head assembly 100 generally comprises a mixer port assembly 200, a liquor port assembly 300, a diffuser 400 and a funnel 500.

As shown in FIGS. 6A-6C and 10, the mixer port assembly 200 generally comprises a mixer port head 202 and a plurality of mixer fittings. The mixer fittings include first fittings 204 for receiving still water and carbonated water, second fittings 206 for receiving standard mixer syrup, and third fittings 208 for receiving heavy mix syrup. The third fittings 208 typically have a larger bore therethrough than the second fittings 206 to assist in allowing the heavy mix syrup to pass through the third fittings 208 more easily.

The mixer port head 202 has a plurality of first fitting apertures 210 for receiving and holding the first mixer fittings 204, a plurality of second fitting apertures 212 for receiving and holding the second mixer fittings 206, and a plurality of third fitting apertures 214 for receiving and holding the third mixer fittings 208. The third fitting apertures 214 typically have a larger opening than the second fitting apertures 212 for receiving heavy syrup or the like. The mixer fittings 204, 206, 208 are preferably connected to tubing (not shown) which is connected to a variety of beverage ingredient supplies via a valve and a pump. The beverage ingredient supplies for the second and third fittings 206, 208 may comprise beverages and beverage components in bags, boxes, bottles, bag-in-boxes, or other beverage containers that contain the beverage ingredients that the beverage dispense head assembly 100 will draw from to make mixed beverages. In some examples, the beverage ingredients connected to the second and third fittings 206, 208 are provided from a first set of ingredients, such as mixing ingredients, that may include juice, soft drink syrup, tonic, cocktail mixers, or other types of non-alcoholic ingredients. A water supply, including water and carbonated water is typically connected to the first fittings 204 via tubes for mixing with the mixing ingredients. In a preferred embodiment, there are fourteen fitting apertures in the mixer port head 202, including two first fitting apertures 210 for securing two first fittings 204, ten second fitting apertures 212 for securing ten second fittings 206 and two third fitting apertures 214 for securing two third fittings 208, although alternate embodiments may have a different number of fitting apertures, first fittings, second fittings and third fittings. Generally, however, the total combined number of fittings equals the number of fitting apertures.

Figure 10:
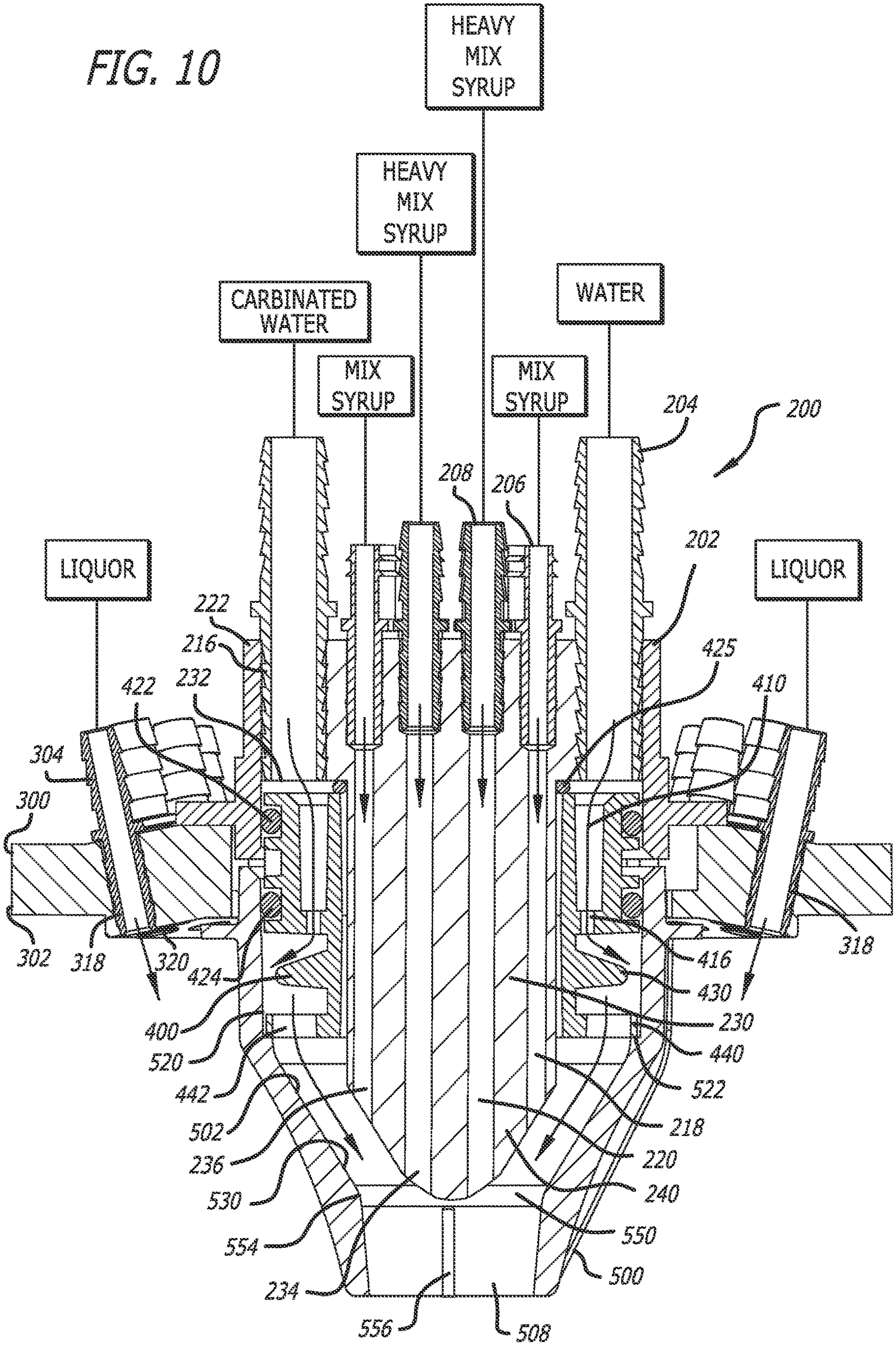
FIG. 10 is a cross-sectional view of the beverage dispense head assembly of FIG. 2.

The mixer port head 202 generally comprises a housing 222 for receiving beverage ingredients from the first set of beverage ingredients. In one embodiment, the mixer port head 202 has a flange 224 extending radially from an outer surface 226 of the housing 222. The flange 224 assists in providing for securing the mixer port assembly 200 to the liquor port assembly 300 as described herein. The mixer port head 202 may also have a shoulder 228, such as annular shoulder 228, to assist in fitting and/or locating the mixer port head 202 on the liquor port assembly 300 as shown in FIG. 10. In one embodiment, the mixer port head 202 preferably has a mixer post 230 extending down from the housing 222. The fitting apertures 210, 212, 214 are generally provided at a top surface 219 of the housing 222. In a preferred embodiment, mixer ports 216, 218, 220, such as bores, extend from the fitting apertures 210, 212, 214 through the housing 222 to mixer port exits 232, 234, 236, respectively. The fitting apertures and a portion of the mixer ports typically receive the mixer fittings. The third mixer ports 220 typically have a larger cross-sectional area than the other mixer ports to accept more viscous liquid.

Figure 6A:
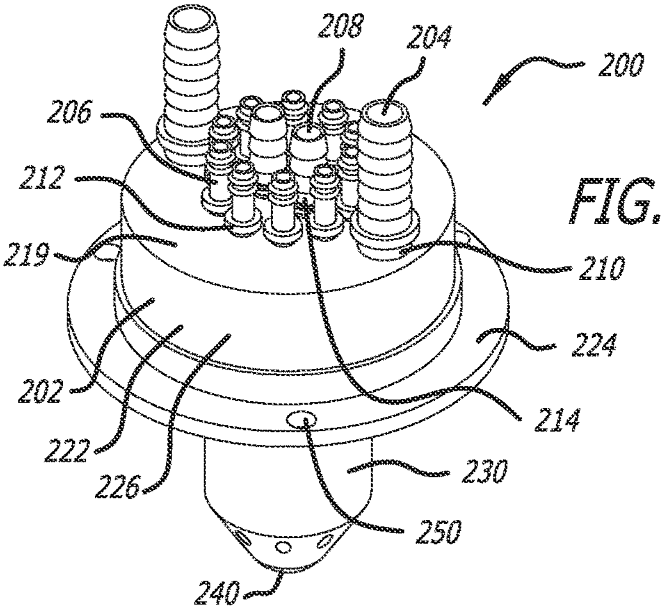
FIG. 6A is a top perspective view of a mixer port assembly according to the present disclosure for the beverage dispense head assembly of FIG. 2.
Figure 6B:
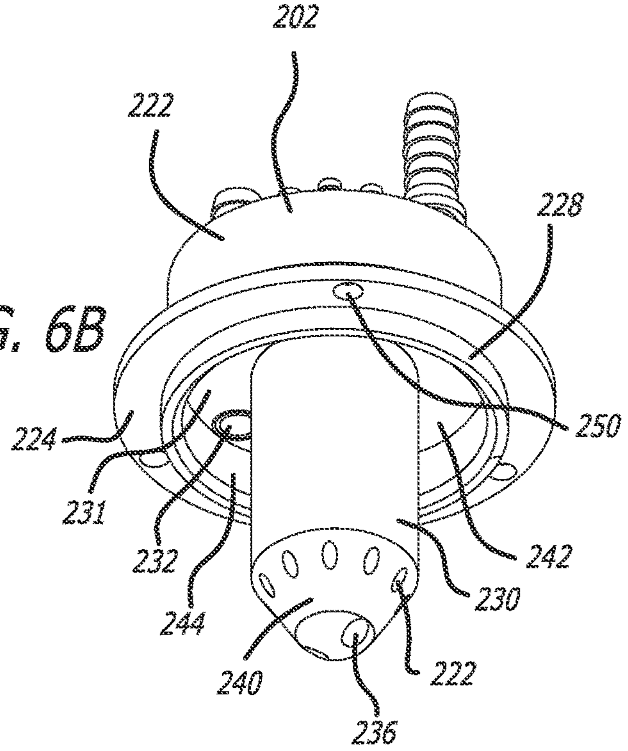
FIG. 6B is a bottom perspective view of the mixer port assembly of FIG. 6A.
Figure 6C:
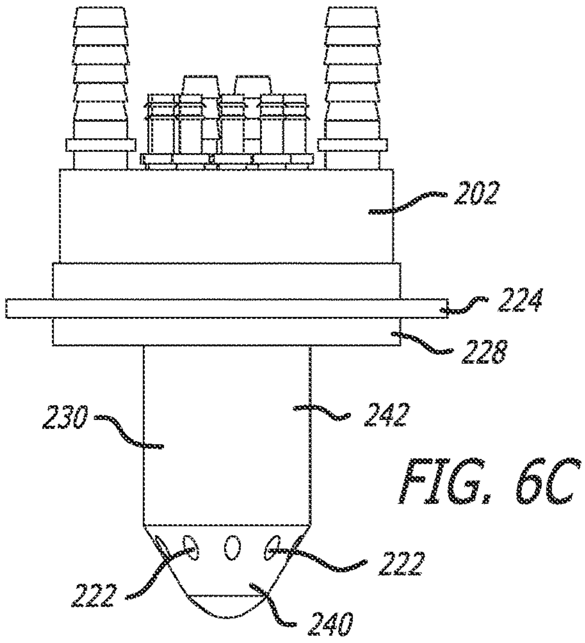
FIG. 6C is a front elevation view of the mixer port assembly of FIG. 6A.

Referring to FIGS. 6B and 10, in one embodiment, the first mixer ports 216 extend only through the housing 222 portion of the mixer port head 202, from the first fitting aperture 210 at the top surface 219 of the housing 222 to the first mixer port exit 232 at a lower surface 221 of the housing 222. Conversely, the second and third mixer ports exits 234, 236 are provided at an end 240 of the mixer post 230, and thus the second and third mixer ports 218, 220 extend from the second and third fitting apertures 212, 214, respectively, through the housing 222 and the mixer post 230, to the second and third mixer port exist 234, 236, respectively, at the end 240 of the mixer post 230. Accordingly, fluid passing through the second and third mixer ports 218, 220 exits much lower in the mixer port head assembly 200 than fluid in the first mixer port 216. And, therefore, the length of the mixer post 230 thus assists in extending the location of the exit ports 234, 236 of the second and third mixer ports 218, 220 below the exit ports of the diffuser 400.

With reference to FIG. 10, in a preferred embodiment the second and third mixer ports 218, 220 extend generally parallel to a longitudinal axis of the funnel 500 of the beverage dispense head assembly 100. In that manner the liquid passing through the second and third mixer ports 218, 220 will be directed toward the center/opening of the funnel 500 for mixing with the water/carbonated water from the first mixer ports 216.

As shown in FIGS. 3, 6A-6C and 10, the end 240 or lower surface 240 of the mixer post 230 is conical or angled in shape. The angled shape helps to promote washing of the mixer post 230, including the second and third mixer ports 218, 220, during the wash process of the beverage dispense head assembly 100.

In one embodiment, the mixer port head 202 also has an annular cavity or recess 242 defined by the lower surface 231 of the housing 222, the outer cylindrical surface 242 of the mixer post 230, and the inner cylindrical surface 244 of the annular shoulder 228 and housing 222. The annular cavity 242 is best seen in FIGS. 6B and 10. As discussed herein, the first end 402 of the diffuser 400 is generally fitted into the annular cavity or recess 242 of the mixer port head 202 during assembly of the beverage dispense head assembly 100. This allows the fluid from the first fittings 210 to pass into the diffuser 400.

In one embodiment, a plurality of apertures 250 are provided in the flange 224 that extends radially from the outer surface 226 of the housing 222 of the mixer port head 202. The flange 224, as explained herein, generally rests on an upper surface of the liquor port assembly 300, and fasteners extend through the apertures 250 to secure the mixer port assembly 200, via the mixer port head 202, to the liquor port assembly 300.

The liquor port assembly 300 is best illustrated in FIGS. 3-5, 7A-7C and 10. In one embodiment, the liquor port assembly 300 generally comprises a liquor port head 302 and a plurality of liquor fittings 304, also referred to herein as fourth fittings 304, for receiving beverage ingredients. In one embodiment, the beverage ingredients typically provided to the liquor fittings 304 are provided from a second set of ingredients that may include a variety of alcoholic ingredients, such as rum, gin, vodka, whiskey, tequila, etc. Non-alcoholic ingredients that do not require mixing with soda or water are also able to be dispensed through these ports.

Figure 7A:
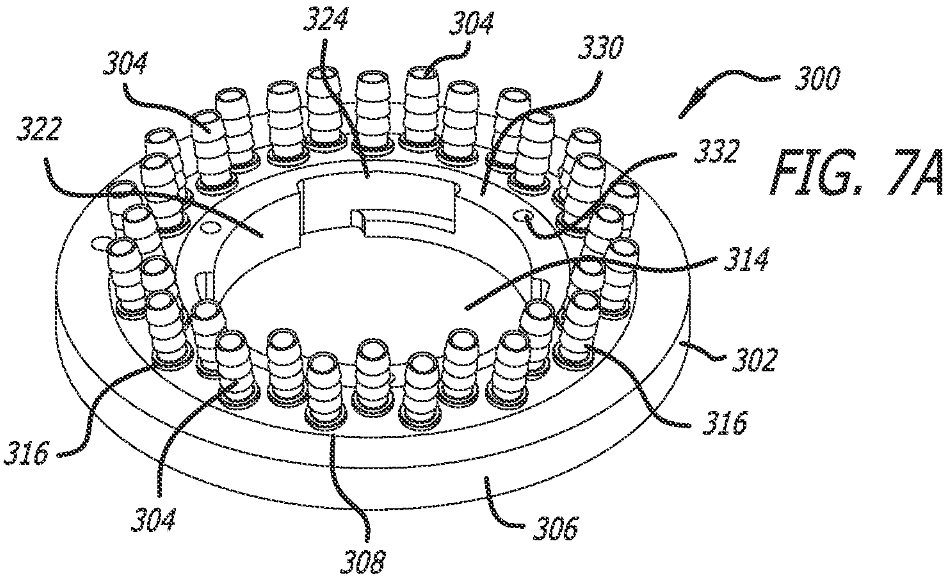
FIG. 7A is a top perspective view of a liquor port assembly according to the present disclosure for the beverage dispense head assembly of FIG. 2.
Figure 7B:
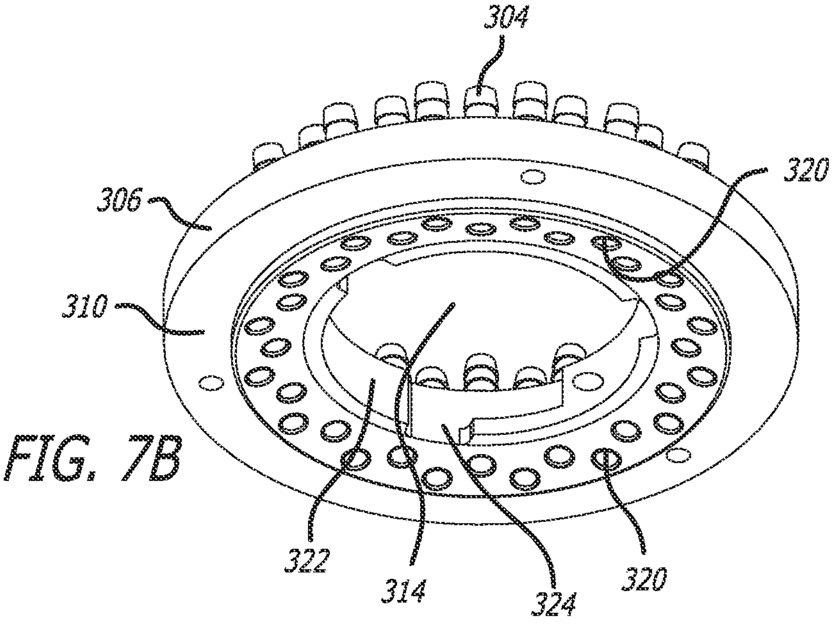
FIG. 7B is a bottom perspective view of the liquor port assembly of FIG. 7A.
Figure 7C:
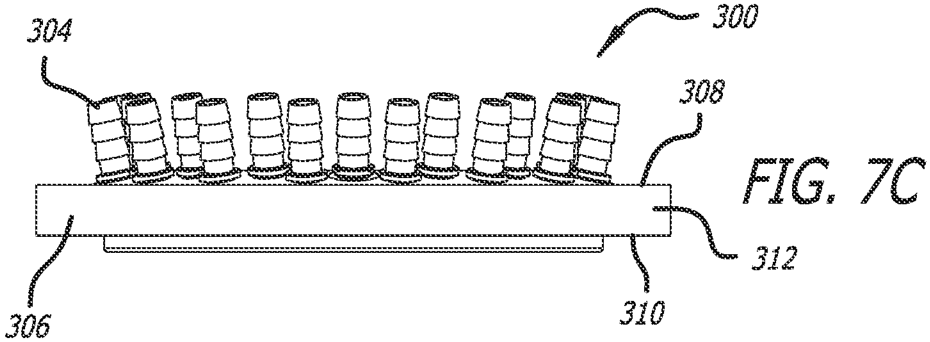
FIG. 7C is a front elevation view of the liquor port assembly of FIG. 7A.

The liquor port head 302 generally comprises a housing 306 that forms a perimeter, such as, for example, a ring, around the mixer port head 202. In one embodiment, as shown in FIGS. 7A and 7B, the liquor port head 302 is generally shaped as a short but thick-walled cylinder. In one embodiment, the housing 306 has a top surface 308, a bottom surface 310, a housing wall thickness 312 between the top surface 308 and the bottom surface 310, and an inner opening 314. In a preferred embodiment the inner opening 314 of the housing 306 is a bore 314 with a bore wall 322. The inner opening 314 is sufficiently large to allow a portion of the mixer port head 202 to pass therethrough. In one embodiment, as shown in FIGS. 7A and 7B, the bore wall 322 has a plurality of openings 324 that operate as bayonet-style receivers in connection with the shoulder 228 of the mixer port head 202 to secure the funnel 500, as is described herein.

In one embodiment, the liquor port head housing 306 also has a plurality of fourth fitting apertures 316 in the top surface 308 thereof. Each fourth fitting aperture 316 is an opening to a liquor port 318 that extends to a liquor exit 320 at the bottom surface 310 of the housing 306. Thus, the liquor port 318 extends through the entire thickness of the housing 306. In a preferred embodiment the apertures 316 are arranged in an arcuate design about the liquor port head housing 306. Separate fourth fittings 304 are housed in the respective liquor ports 318.

In a preferred embodiment, as shown in FIGS. 7A-7C and 10, a portion of the top surface 308 of the housing is angled inward rather than being horizontal. And, in a preferred embodiment a portion of the bottom surface 310 is similarly angled inwardly. The angled top surface 308 provides that the liquor ports 318 will be positioned tangentially with respect to a horizontal plane of the liquor port head housing 306. In this inward angled design, the fourth fittings 304 within the liquor ports 318 will dispense the beverage ingredients inwardly and toward the center of the beverage container that is positioned below the beverage dispense head assembly 100. Such an arrangement increases the chances that the liquid dispensed through the fourth fittings 304 is placed within the beverage container and is not dispensed outside the beverage container. This configuration also allows for better mixing with the beverage ingredients dispensed from funnel 500. The fourth fittings 304 are generally connected to tubes (not shown) that are fluidly connected to a plurality of beverage supplies. In the current embodiment, the fourth fittings 304 are connected to a supply of alcoholic beverage ingredients but it should be apparent to one of ordinary skill that any beverage ingredient may suffice. In one embodiment the liquor port head housing 306 has thirty-two (32) liquor ports 318/fittings 304 combinations, however, it is understood that a greater or lesser number of aperture/fitting combinations may be present. For example, in a first alternate embodiment the liquor port head housing 306 has sixteen port/fitting combinations, and in a second alternate embodiment the liquor port head housing 306 has sixty-four port/fitting combinations for dispensing alcoholic beverage ingredients. As can be seen from FIGS. 4, 5 and 7A-7C, in various embodiments a first arcuate arrangement of ports/fittings is provided, and a second arcuate arrangement of ports/fittings is also provided and located concentric to the first arcuate arrangement.

The liquor port head housing 306 also has an annular surface 330 adjacent the inner opening 314. In one embodiment, as best shown in FIG. 10, a portion of the housing 222 and the mixer post 230 of the mixer port head 202 extend through the opening 314, and the flange 224 of the mixer port head 202 sits on the annular surface 330 to position the mixer port assembly 200 on the liquor port assembly 300. Similarly, the shoulder 228 of the mixer port head 202 will generally be adjacent the bore wall 322 of the bore 314 of the liquor port head housing 306.

Figure 4:
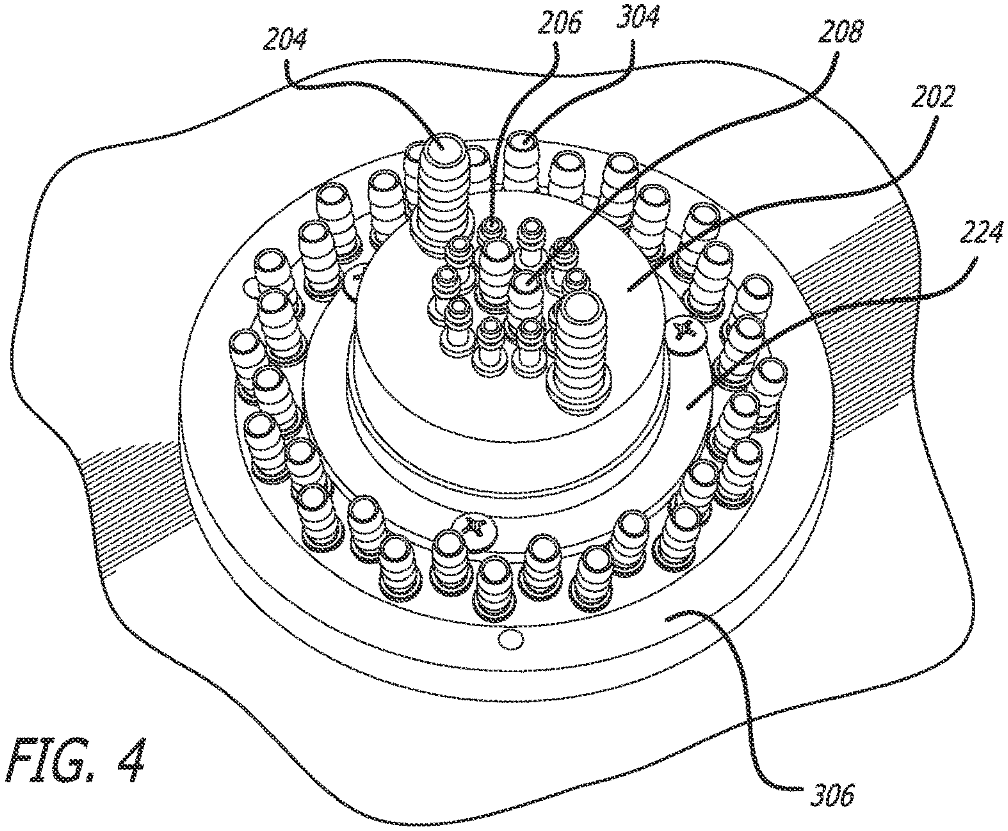
FIG. 4 is a perspective view of the top of the beverage dispense head assembly of FIG. 2.
Figure 5:
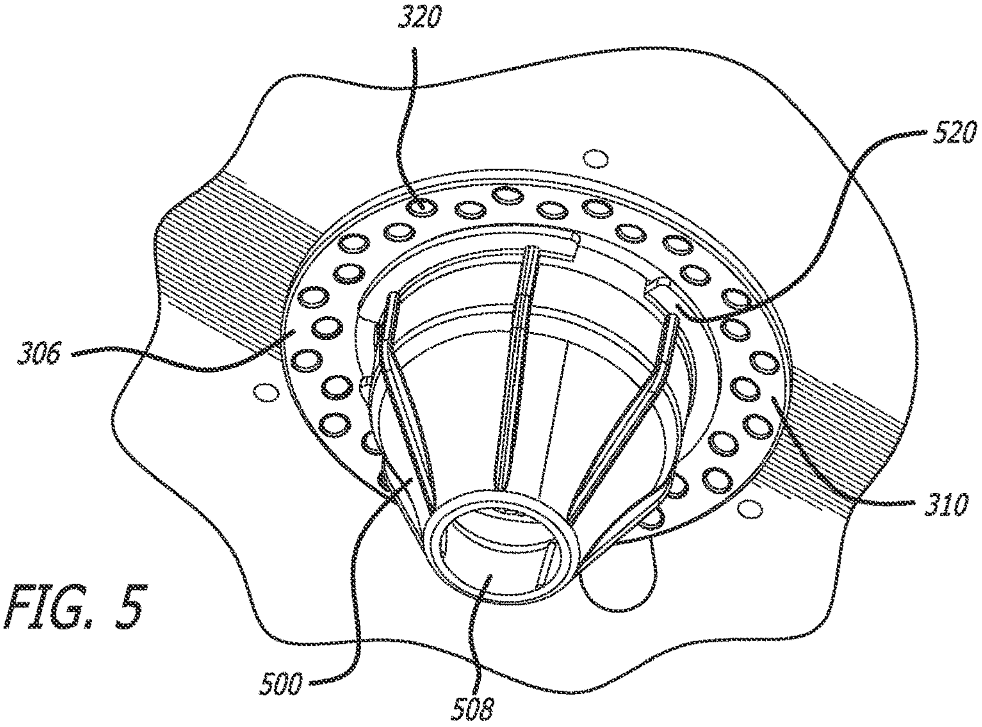
FIG. 5 is a perspective view of the bottom of the beverage dispense head assembly of FIG. 2.

A plurality of receivers 332, such as threaded openings 332, are provided in the annular surface 330 of the liquor port head housing 306. The arrangement of the receivers 332 mates with the arrangement of the apertures 250 in the flange 224 of the mixer port head 202. As shown in FIG. 4, fasteners extend through the apertures 250 and into the receivers 332 to secure the mixer port assembly 200, via the mixer port head 202, to the liquor port head housing 306 of the liquor port assembly 300.

Figure 3:
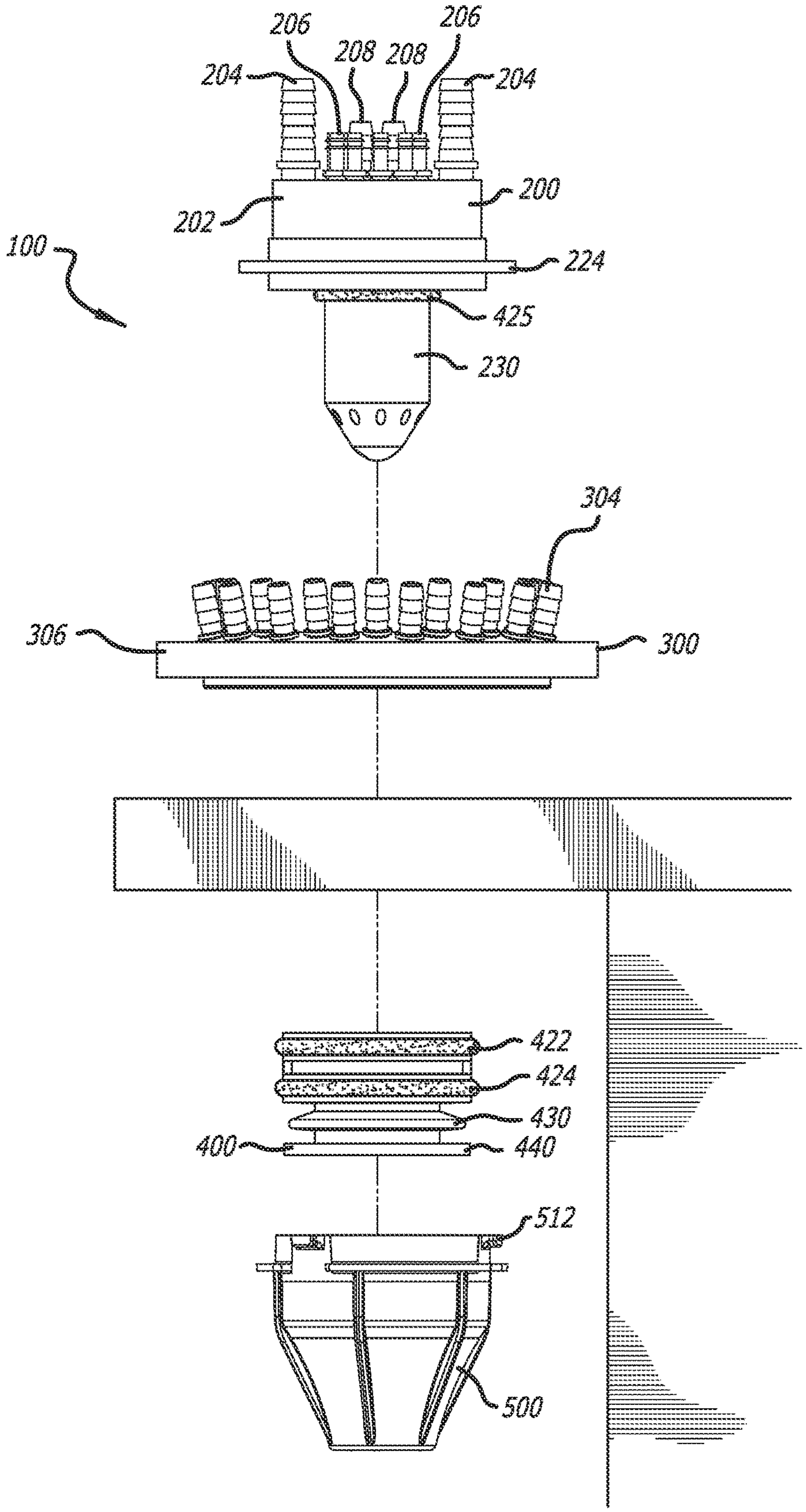
FIG. 3 is an exploded front elevation view of the beverage dispense head assembly of FIG. 2.
Figure 11:
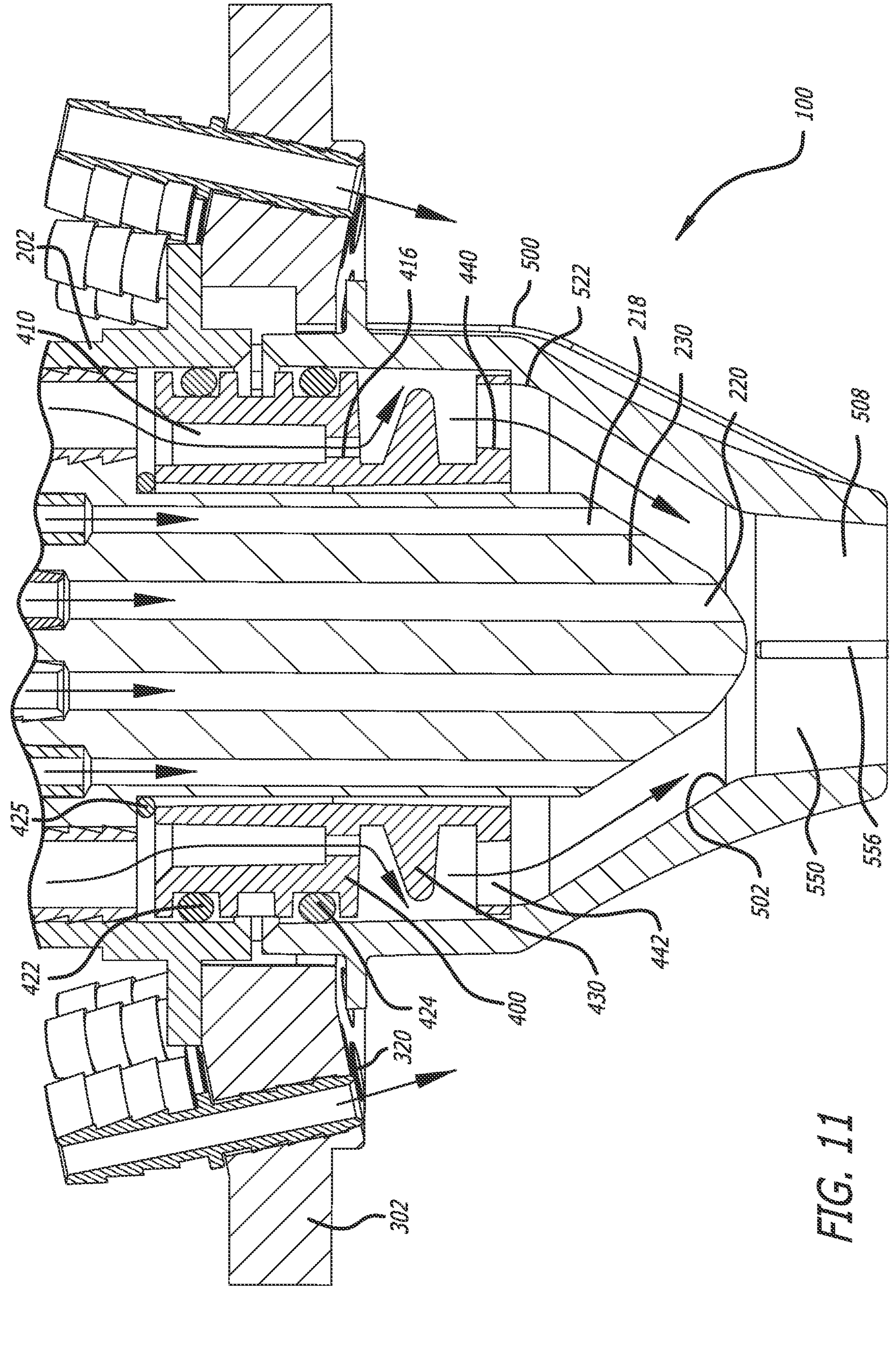
FIG. 11 is an enlarged view of a portion of the cross-sectional view of the beverage dispense head assembly of FIG. 10.

Referring to FIGS. 3, 10 and 11, the beverage dispense head assembly 100 includes a diffuser 400. The diffuser 400 may provide several benefits for the beverage dispense head assembly 100, including providing even flow about an inner circumference of the funnel 500, diffuse the fluid exiting out of the first mixer fittings 204 which may also activate the carbonation, and slow down the fluid before mixing with the concentrated mixer fluid from the second and third mixer fittings 206, 208.

Figure 8A:
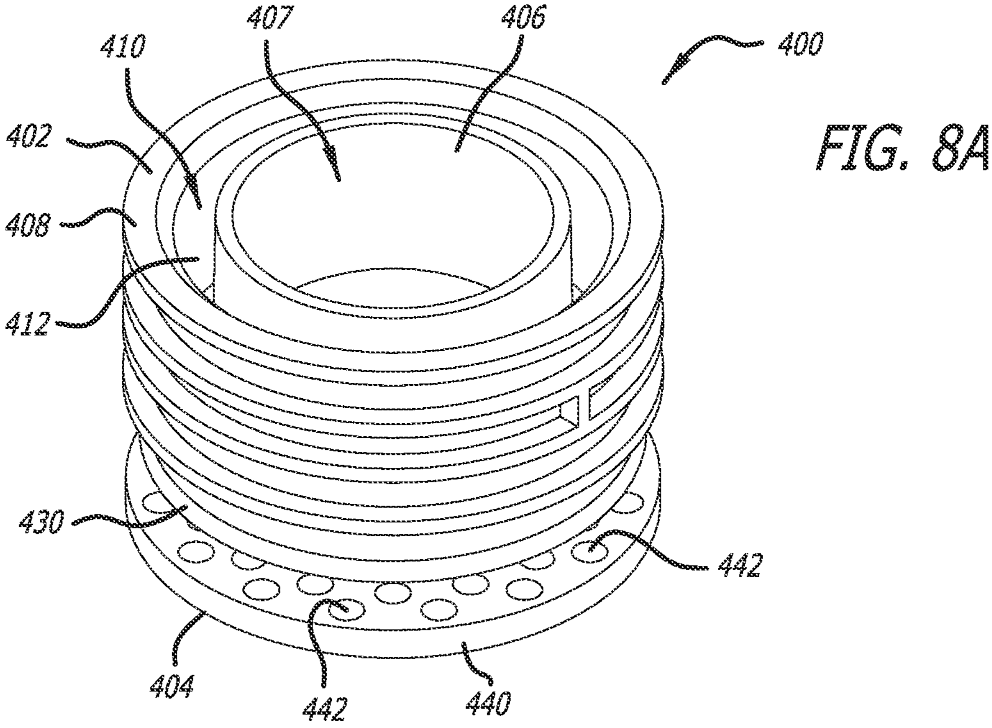
FIG. 8A is a top perspective view of a diffuser according to the present disclosure for the beverage dispense head assembly of FIG. 2.
Figure 8B:
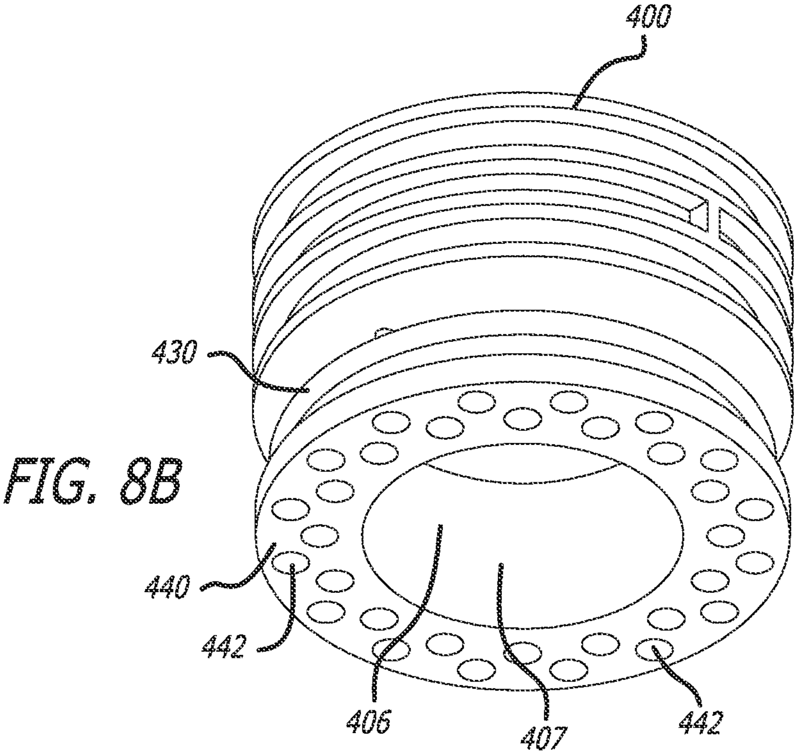
FIG. 8B is a bottom perspective view of the diffuser of FIG. 8A.
Figure 8C:
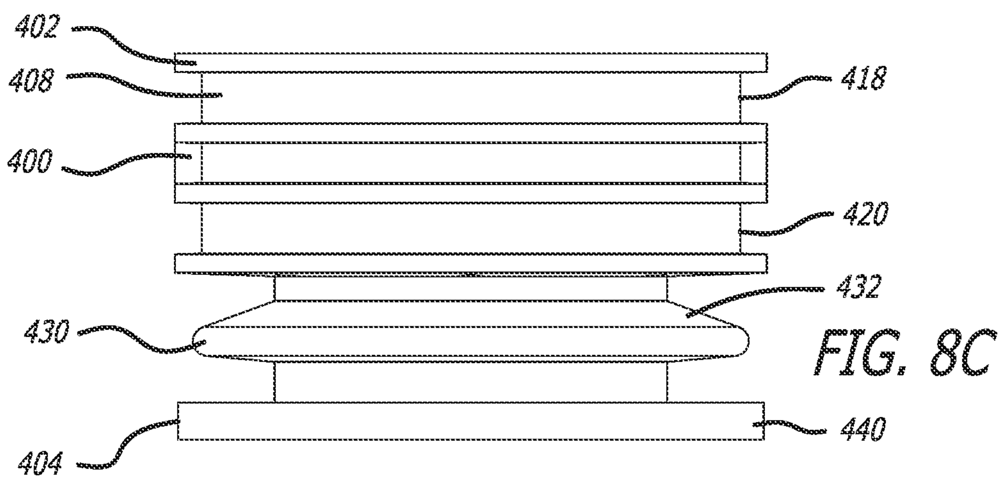
FIG. 8C is a front elevation view of the diffuser of FIG. 8A.
Figure 8D:
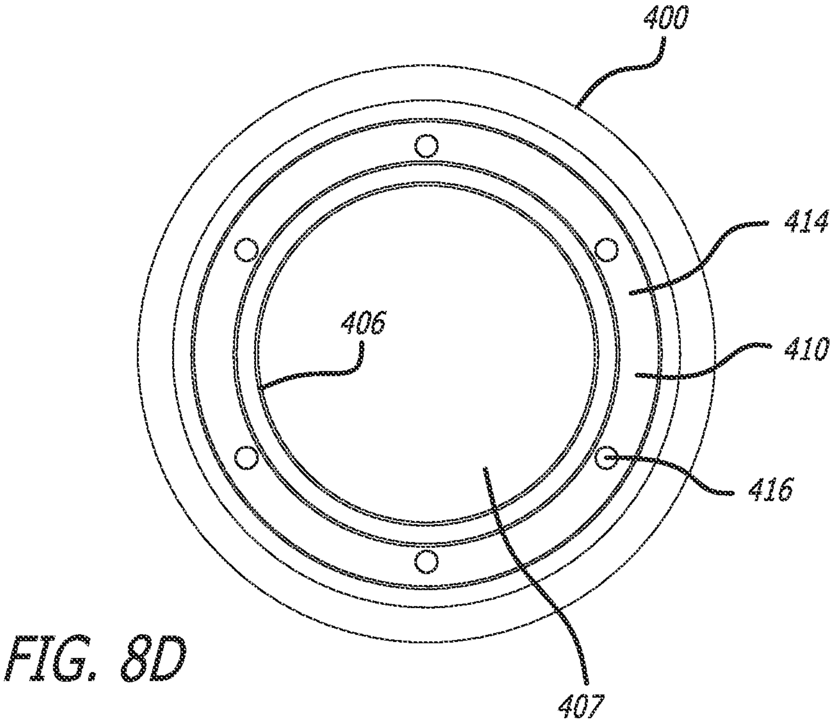
FIG. 8D is a top plan view of the diffuser of FIG. 8A.
Figure 9A:
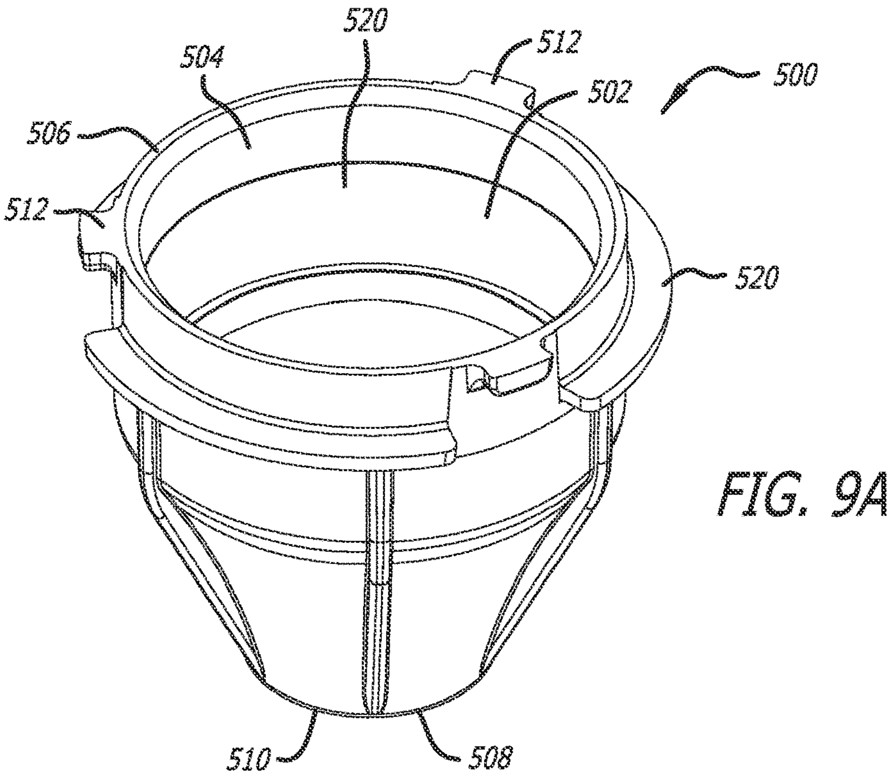
FIG. 9A is a top perspective view of a funnel according to the present disclosure for the beverage dispense head assembly of FIG. 2.
Figure 9B:
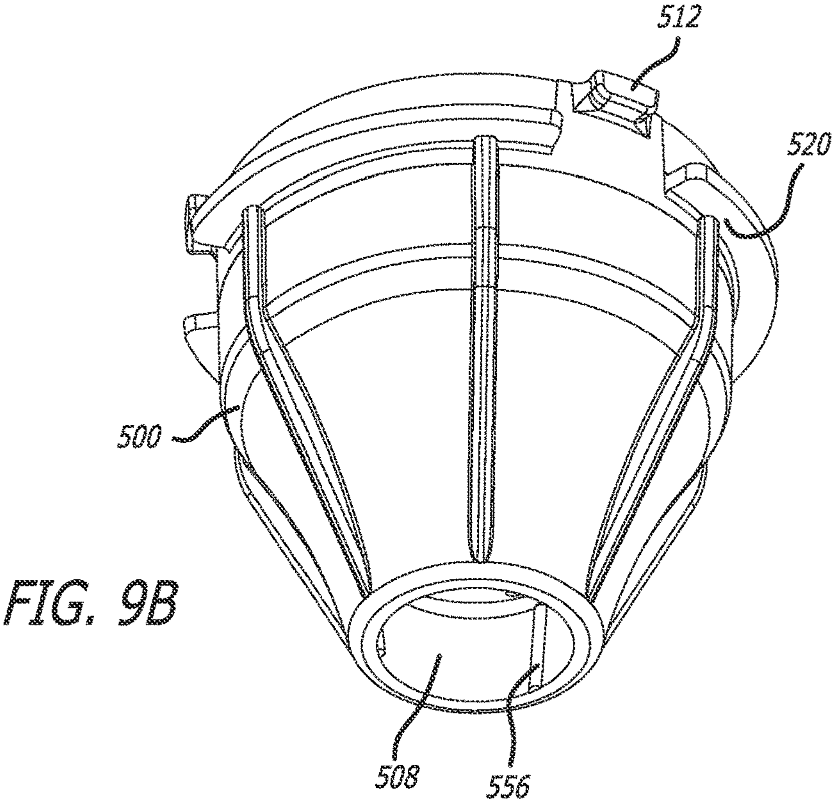
FIG. 9B is a bottom perspective view of the funnel of FIG. 9A.
Figure 9C:
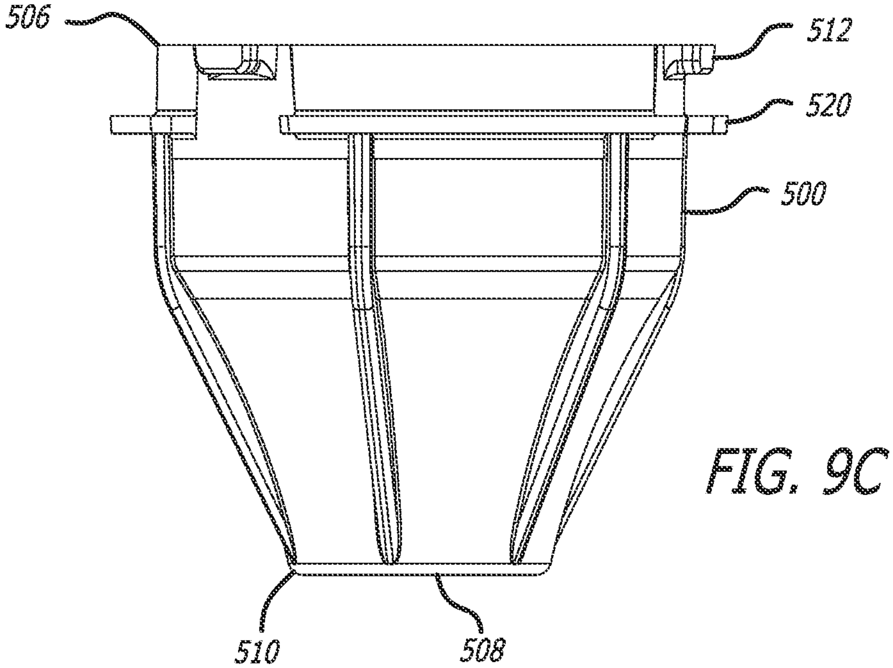
FIG. 9C is a front elevation view of the funnel of FIG. 9A.
Figure 9D:
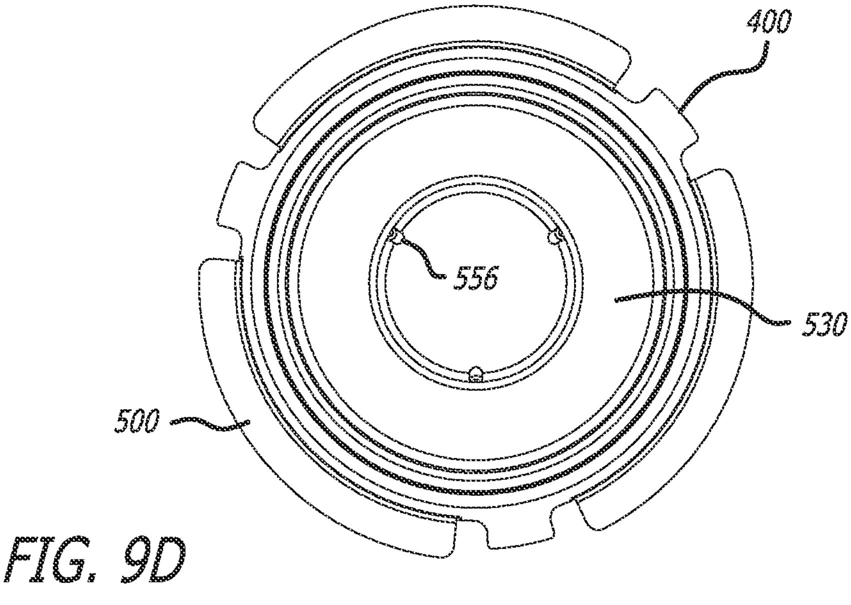
FIG. 9D is a top plan view of the funnel of FIG. 9A.

As shown in FIGS. 8A-8D, in one embodiment, the diffuser 400 has a first end 402 at an entrance to the diffuser 400, and a second end 404 at an exit to the diffuser 400. In general terms, in one embodiment the diffuser 400 is cylindrical in shape, however, the diffuser 400 also has several structural features about its generally cylindrical shape. In one embodiment, the diffuser 400 has a generally cylindrical inner wall 406 that defines a central bore 407. At the first end 402 of the diffuser 400, an outer wall 408, also generally cylindrically shaped, is spaced from the inner wall 406 to create an annular diffuser cavity 410 between the inner wall 406 and the outer wall 408. The opening 412 to the annular diffuser cavity 410 is open, but there is a bottom wall 414 at the second end of the annular diffuser cavity 410. The first end 402 of the diffuser 400 is generally fitted into the annular cavity or recess 242 of the mixer port head 202. As shown in FIGS. 8D and 10, a plurality of apertures 416 are provided in the bottom wall 414 to allow fluid that enters the opening 412 of the annular diffuser cavity 410 to escape out of the bottom of the annular diffuser cavity 410 through the apertures 416.

As shown in FIGS. 8A-8C, 10 and 11, an outer surface of the outer wall 408 has a plurality of annular grooves 418, 420 to house gaskets or O-rings 422, 424. The top annular groove 418 and O-ring assist in sealing the diffuser 400 against an inner surface of the shoulder 228 of the mixer port head 202. Conversely, the bottom annular groove 420 and O-ring 424 assist in sealing the diffuser 400 against an inner surface 502 of the funnel 500. The O-rings 422, 424 provide fluid tight seals for the liquid passing through the dispense head assembly 100. A third gasket or O-ring 425 is provided at the top of the mixer post 230 where the mixer post 230 extends from the housing 222 of the mixer port head 202. As shown in FIGS. 10 and 11, gasket 425 assists in sealing the diffuser 400 against the mixer port head 202 to direct fluid exiting out of the first fittings 204 into the annular diffuser cavity 410 of the diffuser 400.

In one embodiment, the diffuser 400 has a radially extending annular shoulder 430 extending from the diffuser 400. The annular shoulder 430 is positioned below the annular diffuser cavity 410 of the diffuser 400 but above the second end 404 of the diffuser 400. The annular shoulder 430 has an angled top surface 432 to assist in reducing undesired turbulence of the fluid passing through the diffuser 400, and also to assist in preventing fluid from resting and remaining on the top surface 432 of the shoulder 430. The shoulder 430 diameter is less than an outer diameter of the diffuser 400 to allow fluid to pass around the radial end 434 of the shoulder 430 and between the shoulder 430 and the inner surface 502 of the funnel 500.

A flange 440 is provide at the second end 404 of the diffuser 400. Like the shoulder 430, the flange 440 extends radially outwardly from the outer wall 408 of the diffuser 400. However, unlike the shoulder 430, in one embodiment the flange 440 is not angled but rather extends generally horizontally outward. As best shown in FIGS. 8A, 8B, 10 and 11, a plurality of spreader ports 442 are provided in the flange 440 to allow fluid to escape the diffuser 400.

Referring to FIGS. 3, 9A-9D, 10 and 11, the beverage dispense head assembly 100 also has a mixing bowl or funnel 500 at the outlet to the beverage dispense head assembly 100. As shown in the figures, the funnel 500 has a first opening 504 at a top or first end 506 of the funnel 500, and a second opening 508 at the bottom or second end 510 of the funnel 500. The first opening 504 is larger than the second opening 508. The funnel 500 has a plurality of ears 512 at the first end 506 thereof that are used to mate with the openings 324 in the bore wall 322 of the liquor port head 302 to fixedly secure the funnel 500 to the beverage dispense head assembly 100. In a preferred embodiment, the funnel 500 has three ears 512 and the liquor port head housing 306 has three corresponding openings 324. The ears 512 and openings 324 are preferably spaced approximately 120° apart to be equally spaced about the funnel 500 and liquor port head housing 306, respectively. As discussed above, the openings 324 are preferably bayonet-style openings 324 so that the funnel 500 with the ears 512 (and the diffuser 400 inside the funnel 500) are inserted into up into the liquor port housing 306 and into the openings 324, and then the funnel 500 is rotated to lock the funnel 500 and diffuser 400 to the bayonet-style openings 324 of the liquor port housing 306. The funnel 500 may also have an outwardly extending flange 520 that may engage a portion of the bottom surface 310 of the liquor port housing 306.

As best shown in FIGS. 10 and 11, the inner surface 502 of the funnel 500 has a generally cylindrical portion 520 toward the first end 506 of the funnel 500 that mates with the diffuser 400. The inner surface 502 also has a shoulder 522 that mates with a bottom of the flange 440 at the second end 404 of the diffuser 400 to properly seat the diffuser 400 within the funnel 500 and with respect to the mixer port assembly 200 and the liquor port assembly 300. The bottom O-ring 424 in the diffuser 400 fluidly seals the diffuser 400 against the inner surface 502 of the funnel 500. When the funnel 500 and diffuser 400 are connected to the liquor port housing 306, as shown in FIGS. 10 and 11, the mixer post 230 extends through the central bore 407 in the diffuser 400.

Referring again to FIGS. 10 and 11, in one embodiment, adjacent the generally cylindrical portion 520 of the interior of the funnel 500 is an inwardly and downwardly sloped portion 530. In one embodiment the angle of the interior surface 502 of the sloped portion 530 of the funnel 500 is approximately 55°, however a greater or lesser angle that maintains a generally laminar flow of the fluids therein is acceptable. In one embodiment the angle of the sloped portion 530 of the funnel 500 is approximately equal to the angle of the lower surface 240 of the mixer post 230. A mixing cavity or mixing chamber 550 is defined by the inner surface 502 adjacent the sloped portion 530 and toward the second end 510 of the funnel 500, including between the mixer post 230 and the inner surface 502 of the funnel 500. The funnel 500 also has a transition area 554 distal the bottom end 510 leading to the second opening 508 at the bottom end 510 of the funnel 500. In one embodiment the second opening 508 is approximately 0.7" in diameter. As shown in FIGS. 9B, 9D, 10 and 11, a plurality of ribs 556 are provided on the inner surface 502 of the funnel 500 adjacent the second opening 508. The ribs 556 assist in disrupting capillary action of the fluid at the second opening 508 of the funnel 500.

As shown in FIGS. 10 and 11, the beverage ingredients are preferably mixed in the mixing chamber 550 of the funnel 500. The second and third mixer ports 234, 236 at the end 240 of the mixer post 230 such be downstream of the diffuser spreader ports 442 to attain optimal mixing and to reduce the likelihood of bleeding of mixers between uses of the beverage dispense head assembly 100. Additionally, the angle toward the end 240 of the mixer post 230 promotes washing of the mixer ports after pouring to additional reduce any bleeding of mixers. are provided in the flange 440 to allow fluid to escape the diffuser 400. In one embodiment, water or soda is separately dispensed, such as a 10 ml burst, through the first mixing ports following the dispensing of the requested beverage to clean the inner surface 502 of the funnel 500 as well as to clean the mixer post 230 and all of the mixer ports thereon between beverage dispenses. In such a manner residual amounts of a dispensed beverage ingredient are removed from the interior of the beverage dispense head assembly 100 to prevent unwanted cross-mixing of beverage ingredients.

The particular relational configuration of the mixing ports at the end of the mixing post 240 and mixing chamber 550 of the funnel 500, shown in FIGS. 10 and 11, as well configuration of the diffuser 400, assists to provide that each beverage ingredient dispensed through the mixer port assembly 200 will be mixed prior to entering a waiting beverage container.

In order to fully understand the arrangement of the components described above, FIGS. 10 and 11 are provided and illustrate a cross-sectional view of one embodiment of the beverage dispense head assembly 100, including the mixer port assembly 200, liquor port assembly 300, diffuser 400 and funnel 500. In this embodiment, the first set of beverage ingredients is drawn via tubes connected to the beverage ingredient storage containers. The tubes are connected to second and third fittings 206, 208 and the mixer beverage ingredients are dispensed through the second and third mixing ports 234, 236 in the mixer post 230. Simultaneously, water, including carbonated water if required, is provided to the first fitting 204 and dispensed into the into the annular diffuser cavity 410 of the diffuser 400. The water fills the annular diffuser cavity 410 and escapes generally in an even manner through the apertures 416 annularly spaced in the bottom wall 414 of the annular diffuser cavity 410. The water flows rather evenly over the annular shoulder 430 to be further diffused and passes through the spreader ports 442 in the flange 440 to exit the diffuser 400. Upon entering the mixing chamber 550 of the funnel 500 the diffused water and the beverage ingredients are mixed together. The beverage ingredients mix as they travel in mixing chamber 550, and ultimately exit through the second opening 508 in the funnel 500 where they are provided to a beverage container placed below the funnel 500. The specific beverage ingredient from the first set of beverage ingredients that is dispensed is dependent upon user input.

A beverage ingredient from the second set of ingredients, typically a beverage containing alcohol, is dispensed into the beverage container via the fourth fittings 304. It is understood that the fourth fittings 304 are each separately connected to one of the second set of beverage ingredients via tubing. The specific beverage ingredient from the second set of beverage ingredients that is dispensed is dependent upon user input. As shown in FIGS. 10 and 11, the apertures 316 that hold the fittings 304 are angled inward such that the beverage ingredient from the second set of beverage ingredients is dispensed into the cup at an angle toward the center of the cup. Since the first set of ingredients are dispensed into the funnel 500 while the second set of ingredients is dispensed directly into the cup, the first set of ingredients and second set of ingredients are not mixed until they are combined in the cup. This configuration allows for the creation of non-alcoholic mixed drinks. Further the possibility of unintentionally providing an alcoholic beverage is reduced since the only way for alcohol to get into the cup is by being dispensed directly in the cup. Additionally, the likelihood of contamination of a nonalcoholic drink is reduced as the interior of the funnel 500 never has residual alcohol left in it from making a previous alcoholic beverage.

One of ordinary skill will recognize that the order in which the beverage ingredients are dispensed is of no consequence to the current design. A beverage ingredient may be dispensed from the second set of beverage ingredients prior to being dispensed from the first set of ingredients, during dispensing of the first ingredient or following dispensing of the first ingredient.

The embodiments detailed hereinabove may be combined in full or in part, with any alternative embodiments described.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the present disclosure may be embodied in other specific forms without departing from the spirit or central characteristics thereof. The present examples and embodiments, therefore, are to be considered in all respects as illustrative and not restrictive, and the Claims are not to be limited to the details given herein. Accordingly, while the specific embodiments have been illustrated and described, numerous modifications come to mind without significantly departing from the spirit of the disclosure and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A beverage dispense head assembly comprising:

a liquor port assembly comprising a liquor port head housing having a plurality of liquor ports positioned at an acute angle with respect to a horizontal plane of the liquor port head housing to dispense liquid through the liquor ports at an inward angle and outside of a mixing bowl;

a mixer port assembly fixed to the liquor port assembly, the mixer port assembly comprising a mixer port head and a downwardly extending mixer post extending through the liquor port assembly, the mixer port assembly having at least one first mixer port extending through the mixer port head and a plurality of second mixer ports extending through the mixer post;

the mixing bowl having a first opening at a first end thereof leading to a cavity therein, and a second opening at a second end thereof providing an exit to the mixing bowl, the second opening being smaller than the first opening, wherein the mixing bowl, adjacent the first end thereof, is removable fixed to the liquor port assembly adjacent a second side of the liquor port head housing; and, a diffuser located within the cavity of the mixing bowl and around the mixer post of the mixer port assembly to receive liquid passing through the at least one first mixer port, the diffuser being cylindrically shaped, the diffuser having a first end and a second end, a cylindrical inner wall that defines a central bore through which the mixer post extends, a cylindrical outer wall spaced from the cylindrical inner wall to create an annular diffuser cavity therebetween, the first end having an annular opening providing access to the diffuser cavity, the diffuser cavity having a bottom wall with a plurality of apertures, a radially extending annular shoulder extending from the diffuser between the bottom wall of the diffuser cavity and the second end of the diffuser, the annular shoulder having an angled top surface, and a flange extending from the diffuser adjacent the second end, the flange having a plurality of ports to allow fluid to escape from the diffuser and into the cavity of the mixing bowl.

2. The beverage dispense head assembly of claim 1, wherein the liquor port head housing is in the shape of a ring.

3. The beverage dispense head assembly of claim 1, wherein at least one of the plurality of second mixer ports has a larger cross-sectional area than other of the plurality of second mixer ports.

4. The beverage dispense head assembly of claim 1, wherein the liquor port assembly further comprises a fitting within each of the liquor ports to receive tubing.

5. The beverage dispense head assembly of claim 1, wherein the liquor port head has a receiver for receiving a mating member of the mixing bowl to releasably secure the mixing bowl to the liquor port head.

6. The beverage dispense head assembly of claim 1, further comprising a shoulder on an inner surface of the mixing bowl that engages the flange of the diffuser to assist in seating the diffuser adjacent the mixer port head in the beverage dispense head assembly.

7. The beverage dispense head assembly of claim 1, further comprising a plurality of ribs on an inner surface of the mixing bowl adjacent the second opening of the mixing bowl.

8. The beverage dispense head assembly of claim 1, wherein the flange of the diffuser extends radially distal the shoulder of the diffuser.

9. The beverage dispense head assembly of claim 1, further comprising a first seal between the diffuser and the mixer port head, and a second seal between the diffuser and the mixing bowl.

10. The beverage dispense head assembly of claim 9, further comprising a third seal between the diffuser and the mixer port head.

11. A beverage dispense head assembly comprising:

a liquor port assembly;

a mixer port assembly fixed to the liquor port assembly, the mixer port assembly comprising a mixer port head having at least one first mixer port and a plurality of second mixer ports, wherein at least one of the plurality of second mixer ports has a larger cross-sectional area than other of the plurality of second mixer ports;

a mixing bowl having a first opening at a first end thereof leading to a cavity therein, and a second opening at a second end thereof providing an exit to the mixing bowl, the second opening being smaller than the first opening, wherein the mixing bowl, adjacent the first end thereof, is removable fixed to the liquor port assembly adjacent a second side of the liquor port assembly, and wherein the at least one first mixer port and the plurality of second mixer ports all operably dispense liquid into the mixing bowl; and, a diffuser located within the cavity of the mixing bowl and adjacent the mixer port assembly to receive liquid passing through at least one of the first mixer ports, the diffuser having a first end and a second end, the first end having an annular opening providing access to an annular diffuser cavity, the diffuser cavity having a bottom wall with a plurality of apertures, a shoulder extending from the diffuser between the bottom wall of the diffuser cavity and the second end of the diffuser, and a flange extending from the diffuser adjacent the second end, the flange having a plurality of ports to allow fluid to escape from the diffuser and into the cavity of the mixing bowl.

12. The beverage dispense head assembly of claim 11, wherein the shoulder of the diffuser has an angled top surface.

13. The beverage dispense head assembly of claim 11, wherein the liquor port assembly comprises a liquor port head housing having a plurality of liquor ports positioned at an acute angle with respect to a horizontal plane of the liquor port head housing to dispense liquid through the liquor ports at an inward angle.

14. The beverage dispense head assembly of claim 13, wherein all of the liquor ports of the liquor port head housing dispense liquid exterior of the mixing bowl.

15. The beverage dispense head assembly of claim 11, wherein the mixer port head has a downwardly extending mixer post, and wherein some of the second mixer ports extend through the mixer post.

16. The beverage dispense head assembly of claim 15, wherein the diffuser is cylindrically shaped and is positioned around the mixer post of the mixer port head.

17. A beverage dispense head assembly comprising:

a liquor port assembly comprising a liquor port head housing having a plurality of liquor ports positioned at an acute angle with respect to a horizontal plane of the liquor port head housing to dispense liquid through the liquor ports at an inward angle;

a mixer port assembly fixed to the liquor port assembly, the mixer port assembly comprising a mixer port head and a downwardly extending mixer post, the mixer port assembly having at least one first mixer port extending through the mixer port head and a plurality of second mixer ports extending through the mixer post;

a mixing bowl having a first opening at a first end thereof leading to a cavity therein, and a second opening at a second end thereof providing an exit to the mixing bowl, the second opening being smaller than the first opening, wherein the mixing bowl, adjacent the first end thereof, is removable fixed to the liquor port assembly adjacent a second side of the liquor port assembly, and wherein the at least one first mixer port and the plurality of second mixer ports all operably dispense liquid into the mixing bowl; and, a diffuser located within the cavity of the mixing bowl and adjacent the mixer port assembly to receive liquid passing through some of the mixer ports, the diffuser having a first end and a second end, the first end having an annular opening leading to an annular diffuser cavity, the diffuser cavity having a bottom wall with a plurality of apertures, a shoulder extending from the diffuser between the bottom wall of the diffuser cavity and the second end of the diffuser, and a flange extending from the diffuser adjacent the second end, the flange having a plurality of ports to allow fluid to escape from the diffuser and into the cavity of the mixing bowl.

18. The beverage dispense head assembly of claim 17, wherein at least one of the plurality of second mixer ports has a larger cross-sectional area than other of the plurality of second mixer ports.

19. The beverage dispense head assembly of claim 17, wherein the mixer port assembly diffuser is cylindrically shaped and is positioned around the mixer post of the mixer port head.

20. The beverage dispense head assembly of claim 17, wherein the flange of the diffuser extends radially distal the shoulder of the diffuser.

21. A beverage dispense head assembly comprising:

a liquor port assembly comprising a liquor port head housing having a plurality of liquor ports;

a mixer port assembly fixed to the liquor port assembly, the mixer port assembly comprising a mixer port head and a downwardly extending mixer post extending through the liquor port assembly;

a mixing bowl having a first opening at a first end thereof leading to a cavity therein, and a second opening at a second end thereof providing an exit to the mixing bowl, the second opening being smaller than the first opening, wherein the mixing bowl, adjacent the first end thereof, is removable fixed to the liquor port assembly adjacent a second side of the liquor port head housing;

a diffuser located within the cavity of the mixing bowl and around the mixer post of the mixer port assembly to receive liquid passing through the mixer port assembly, the diffuser being cylindrically shaped, the diffuser having a first end and a second end, a cylindrical inner wall that defines a central bore through which the mixer post extends, a cylindrical outer wall spaced from the cylindrical inner wall to create a diffuser cavity therebetween, the first end having an opening providing access to the diffuser cavity, the diffuser cavity having a bottom wall with a plurality of apertures, a radially extending annular shoulder extending from the diffuser between the bottom wall of the diffuser cavity and the second end of the diffuser, the annular shoulder having an angled top surface, and a flange extending from the diffuser adjacent the second end, the flange having a plurality of ports to allow fluid to escape from the diffuser and into the cavity of the mixing bowl; and, a first seal between the diffuser and the mixer port head, and a second seal between the diffuser and the mixing bowl.

* * * * *